United States Patent
Theodorides

(10) Patent No.: US 6,225,564 B1
(45) Date of Patent: May 1, 2001

(54) COIL TURN INSULATION SYSTEM FOR HIGH VOLTAGE MACHINES

(75) Inventor: Demetrius C. Theodorides, Bridgewater, NJ (US)

(73) Assignee: Voith Siemens Hydro Power Generation Inc., York, PA (US)

( * ) Notice: Subject to any disclaimer, the term of this patent is extended or adjusted under 35 U.S.C. 154(b) by 0 days.

(21) Appl. No.: 09/039,182

(22) Filed: Mar. 16, 1998

Related U.S. Application Data

(63) Continuation-in-part of application No. 08/519,595, filed on Aug. 24, 1995, now Pat. No. 5,801,334.

(51) Int. Cl.[7] .................................................. H01B 7/00
(52) U.S. Cl. .................................. 174/120 SR; 335/299; 335/223
(58) Field of Search .......................... 174/120 SR, 117 F, 174/117 FF, 120; 335/299, 223, 222

(56) References Cited

U.S. PATENT DOCUMENTS

| | | | |
|---|---|---|---|
| 2,201,845 | * 5/1940 | Wieseman | 171/252 |
| 2,570,786 | * 10/1951 | Flynn et al. | 154/80 |
| 3,431,639 | * 3/1969 | Reimer et al. | 29/605 |
| 3,735,168 | * 5/1973 | Anderson et al. | 310/200 |
| 5,099,159 | * 3/1992 | Liptak et al. | 310/45 |
| 5,633,477 | * 5/1997 | Smith et al. | 174/138 E |

* cited by examiner

Primary Examiner—Kristine Kincaid
Assistant Examiner—William H Mayo, III
(74) Attorney, Agent, or Firm—Foley & Lardner

(57) ABSTRACT

An electrical insulation system for the turns of multiturn stator coils, found in the windings of high voltage hydroelectric generators and other dynamoelectric machines, having only one of the outer strands of each turn insulated with mica with the remaining strands insulated with DACRON-glass. This construction, while offering adequate turn to turn dielectric strength in machines where the turn to turn voltages are moderate, allows the coils to be manufactured at a lower cost and permits the use of strands of significantly larger copper cross-section area.

4 Claims, 2 Drawing Sheets

COIL TURN INSULATION SYSTEM FOR HIGH VOLTAGE MACHINES

This application is a continuation-in-part of application Ser. No. 08/519,595, filed Aug. 24, 1995, now issued on Sept. 1, 1998 as U.S. Pat. No. 5,801,334.

BACKGROUND OF THE INVENTION

This invention is applicable to the art of multiturn stator windings of high voltage hydroelectric generators and more particularly to a new and improved turn insulation system having a higher dielectric strength insulation on one of the outer strands of the turn and a lower dielectric strength insulation on all remaining strands. This invention is also applicable to turbine generators and motors where multiturn stator coils are utilized.

The multiturn stator coils of many high voltage dynamoelectric machines contain two or more identical turns, each turn being constructed of several individually insulated copper strands. These strands are usually individually insulated with a low dielectric strength insulation designed to adequately protect them from the low strand to strand voltages generated during the operation of the dynamoelectric machines. This strand insulation usually consists of one or two layers of bonded DACRON-glass tape, fused DACRON-glass filament or, rarely, enamel. The insulation thickness of these several strand insulation types varies from approximately 0.003 inches for the lower grade enamel insulation to approximately 0.011 inches for the higher grade bonded DACRON-glass tape insulation. The dielectric strength of all these strand insulation types increases almost linearly with the thickness of their insulation but their effectiveness is greatly influenced by the mechanical and thermal operating conditions of the machine in which they are installed. In practice, the selection of the specific type of strand insulation to be used depends equally on dielectric strength considerations as on cost and availability considerations.

The design requirements of high voltage generator and motor multiturn stator windings result in much higher operating voltages occurring between adjacent turns in each coil than between individual strands in each turn. In addition, it is known that voltage surges or steep front impulses occur during the operation of high voltage machines, which surges and impulses also result in high voltages occurring between the turns of multiturn coils. Such relatively high operating voltages combined with high voltage surges and impulses can and do result in premature turn to turn insulation failure. U.S. Pat. No. 2,201,845, May 21, 1940 describes a method of reducing the effects of such high turn to turn voltages by placing coils with high turn to turn insulation near the high voltage end of the electric parallel whereas coils with lower turn to turn insulation are placed near the low voltage end of the electric parallel. Of some interest is also U.S. Pat. No. 4,724,600, Feb. 16, 1988. Another invention which addresses the difficulties associated with manufacturing of the various state of the art strand and turn insulation systems is U.S. Pat. No. 5,099,159, Mar. 24, 1992. All the above inventions, however, describe manufacturing and installation methods and materials which are relatively difficult and expensive.

Most present day manufacturers of high voltage multiturn stator coils utilize lower dielectric strength strand insulation systems and rely on the additional application of one or more dedicated taped layers of relatively higher dielectric strength material such as mica, applied around each turn of the coil, to protect the coils from the high turn to turn voltages. The lower dielectric strength strand insulation in these types of multiturn coils usually consists of one or two taped layers of DACRON-glass bonded directly to the copper surface of the wire or a similar thickness of DACRON-glass filament fused over enameled wire. More rarely, usually in lower voltage machines, plain enameled wire without the benefit of additional layers of DACRON-glass is used. Alternatively, some manufacturers utilize exclusively higher dielectric strength mica insulation, applied directly to the wire strands, which mica insulation protects the coil from both the higher turn to turn voltages as well as from the lower strand to strand voltages. Because mica is much more expensive than DACRON-glass, however, this type of all-mica insulation system is considerably more expensive to manufacture. In addition, because these all-mica insulation systems do not normally utilize any additional dedicated turn insulation, the mica strand insulation is considerably thicker than the DACRON-glass type of strand insulation and, as a result, the copper strands become smaller in cross-section.

SUMMARY OF THE INVENTION

It is the primary object of this invention to provide an improved turn insulation system having mica or other similar higher dielectric strength insulation on only one outer strand of each turn of the coil and DACRON-glass or other similar lower dielectric strength insulation on all other strands.

It is another object of this invention to provide an improved turn insulation system having mica or other similar higher dielectric strength insulation on two or more adjacent strands located on either side of the turn and DACRON-glass or other similar lower dielectric strength insulation on all other strands.

These and other objects of this invention will be apparent to those skilled in the art from the summary and description of the invention which follows.

DESCRIPTION OF THE PROFFERED EMBODIMENTS

Figure 1:
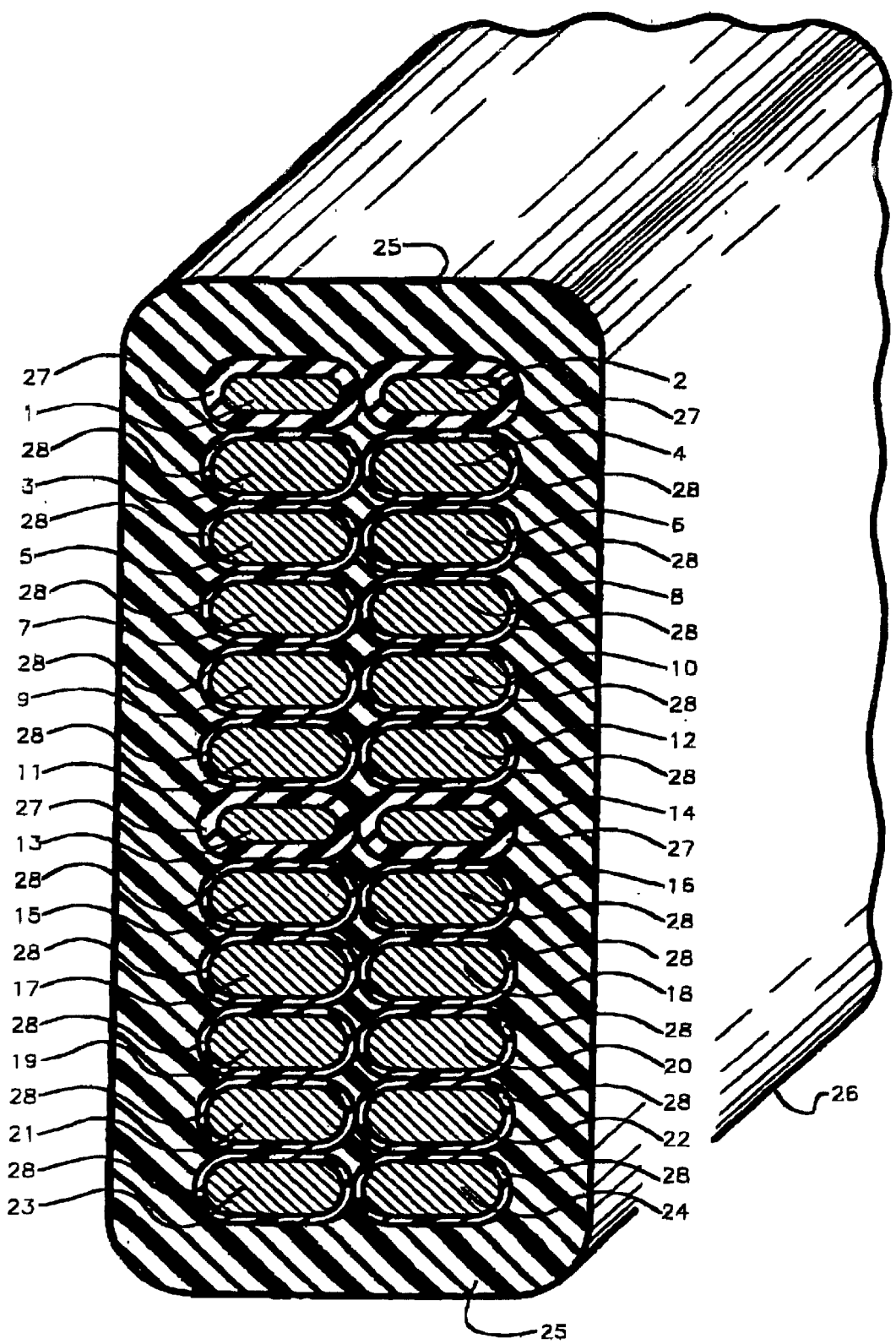
FIG. 1 is a perspective view of a small section of a fully insulated high voltage multiturn coil constructed according to one possible implementation of this invention.

The insulation system depicted in FIG. 1 includes a multiturn coil 26 constructed with two (2) turns. The top turn is made up of the smaller top strands 1 and 2 and the larger remaining strands 3, 4, 5, 6, 7, 8, 9, 10, 11 and 12. The bottom turn is made up of the smaller top strands 13 and 14 and the larger remaining strands 15, 16, 17, 18, 19, 20, 21, 22, 23 and 24. The two turns are enclosed within and completely surrounded by a high voltage insulation wall 25. The top strands 1 and 2 of the top turn and the top strands 13 and 14 of the bottom turn are all insulated with the relatively thick mica strand insulation 27 whereas all the remaining strands 3, 4, 5, 6, 7, 8, 9, 10, 11 and 12 of the top turn and all the remaining strands 15, 16, 17, 18, 19, 20, 21, 22, 23 and 24 of the bottom turn are insulated with the relatively thin DACRON-glass strand insulation 28.

FIG. 1 discloses that the boundary region between the two turns is so insulated that the boundary strands 11 and 12 of the top turn and the boundary strands 13 and 14 of the bottom turn are separated from each other by at least a single layer of the mica or other higher dielectric strength insulation 27.

Figure 2:
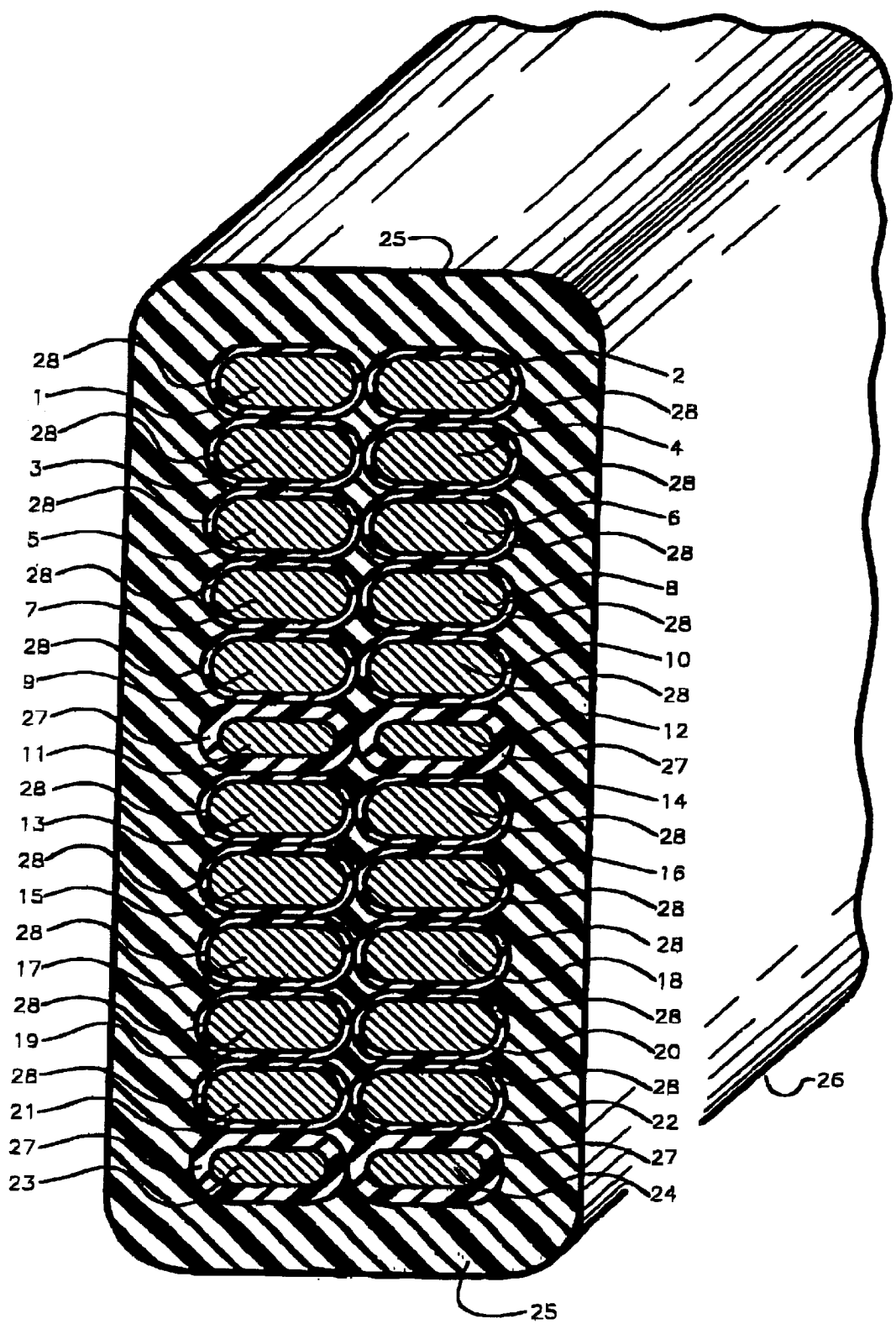
FIG. 2 is a similar perspective view of a small section of a fully insulated high voltage multiturn coil constructed according to an alternative but equivalent implementation of this invention. The coils shown both in FIG. 1 and in FIG. 2 are constructed with two (2) turns, each made up of six (6) strands vertically and two (2) strands horizontally. Clearly such two turn coils are selected as an example only and this invention is equally applicable to coils constructed of any number of at least two turns each of which is made up of any number of at least two vertical strands and at least one horizontal strand.

The insulation system depicted in FIG. 2 also includes a multiturn coil 26 constructed with two (2) turns. The top turn is made up of the smaller bottom strands 11 and 12 and the larger remaining strands 1, 2, 3, 4, 5, 6, 7, 8, 9 and 10. The bottom turn is made up of the smaller bottom strands 23 and 24 and the larger remaining strands 13, 14, 15, 16, 17, 18, 19, 20, 21 and 22. The two turns are enclosed within and completely surrounded by a high voltage insulation wall 25. The bottom strands 11 and 12 of the top turn and the bottom strands 23 and 24 of the bottom turn are all insulated with the relatively thick mica strand insulation 27 whereas all the remaining strands 1, 2, 3, 4, 5, 6, 7, 8, 9 and 10 of the top turn and all the remaining strands 13, 14, 15, 16, 17, 18, 19, 20, 21 and 22 of the bottom turn are insulated with the relatively thin DACRON-glass strand insulation 28. FIG. 2 discloses that, also in this alternative implementation of the invention, the boundary region between the two turns is so insulated that the boundary strands 11 and 12 of the top turn and the boundary strands 13 and 14 of the bottom turn are separated from each other by at least a single layer of mica or other higher dielectric strength insulation 27. As a result of the arrangement of this invention, depicted both in FIG. 1 and in FIG. 2, and in those cases in which the operating and surge or impulse turn to turn voltages are moderate, this novel insulation system offers a fully adequate turn to turn insulation strength. In addition, since only the top strands 1 and 2 of the top turn and the top strands 13 and 14 of the bottom turn of the coil depicted in FIG. 1 are of smaller cross-section area whereas all remaining strands of both top and bottom turns have an enlarged cross-section area, it is clear that as a result of this invention more net copper cross-section area is available for a given overall size of coil cross-section. The same is true for the alternative implementation depicted in FIG. 2 with the difference that in this case it is strands 11 and 12 of the top turn and strands 23 and 24 of the bottom turn that have reduced cross-sections with all the remaining strands being of enlarged cross-sections. Such an increased copper cross-section area results in significantly reduced temperature rises during the operation of the dynamoelectric machine or in significantly increased capacity of the machine. Although the preferred construction shown in FIG. 1 discloses that only the one top strand of each of the two depicted stacks of strands is insulated with mica, it is occasionally necessary, either because the turn to turn operating and surge voltages are higher or because -for other reasons-additional protection is deemed prudent, to have at least one more strand insulated with mica in each stack of strands. This at least one more mica insulated strand is then located adjacent to the top mica insulated strand of each turn i.e., in FIG. 1, strands 1, 2 and at least strands 3 and 4 as well as strands 13, 14, and at least strands 15 and 16 would be insulated with mica whereas all remaining strands would be insulated with DACRON-glass. In the alternative implementation of FIG. 2 the at least one more mica insulated strand is located adjacent to the bottom mica insulated strand of each turn i.e. strands 11, 12 and at least strands 9 and 10 as well as strands 23, 24 and at least strands 21 and 22 would be insulated with mica whereas all remaining strands would be insulated with DACRON-glass. Although the preferred embodiments of FIG.1 and in FIG.2 depict a coil constructed of only two turns where each turn is depicted as being composed of two identical stacks of copper strands, it should be made clear that this depiction is only a preferred embodiment of the invention and that the coil can be constructed of any number of more than two turns where each turn can be made up of one, two or even more stacks of copper strands and where each stack is composed of any number of copper strands without this being a departure from the scope and spirit of the invention.

What is claimed is:

1. An insulation system for windings of high voltage dynamoelectric machines comprising:

a multiturn coil having a substantially rectangular cross-section, said rectangular cross-section having a long side, a short side, a vertical axis corresponding to said long side and a horizontal axis corresponding to said short side;

an insulation wall completely encasing the multiturn coil;

the multiturn coil being constructed from at least two identical insulated turns formed by spirally winding along the vertical axis of the coil an elongated multi-strand conductor;

each of said at least two identical insulated turns comprising one or more stacks of insulated copper strands, said one or more stacks forming a row along the horizontal axis of the coil and said insulated copper strands being stacked along the vertical axis of the coil;

each of said one or more stacks of insulated copper strands comprising at least one top strand insulated with mica or other high dielectric strength insulation and at least one more strand, vertically adjacent thereto, insulated with DACRON-glass or other low dielectric strength insulation.

2. The insulation system of claim 1 wherein, in place of each said top strand being insulated with mica or other high dielectric strength insulation, two or more vertically adjacent strands, located at the top of each of said one or more stacks, are insulated with mica or other high dielectric strength insulation.

3. An insulation system for windings of high voltage dynamoelectric machines comprising:

a multiturn coil having a substantially rectangular cross-section, said rectangular cross-section having a long side, a short side, a vertical axis corresponding to said long side and a horizontal axis corresponding to said short side;

an insulation wall completely encasing the multiturn coil;

the multiturn coil being constructed from at least two identical insulated turns formed by spirally winding along the vertical axis of the coil an elongated multi-strand conductor;

each of said at least two identical insulated turns comprising one or more stacks of insulated copper strands, said one or more stacks forming a row along the horizontal axis of the coil and said insulated copper strands being stacked along the vertical axis of the coil;

each of said one or more stacks of insulated copper strands comprising at least one bottom strand insulated with mica or other high dielectric strength insulation and at least one more strand, vertically adjacent thereto, insulated with DACRON-glass or other low dielectric strength insulation.

4. The insulation system of claim 3 wherein, in place of each said bottom strand being insulated with mica or other high dielectric strength insulation, two or more vertically adjacent strands, located at the bottom of each of said one or more stacks, are insulated with mica or other high dielectric strength insulation.

\* \* \* \* \*